(12) United States Patent
Roldan De Perera et al.

(10) Patent No.: US 12,054,255 B2
(45) Date of Patent: Aug. 6, 2024

(54) DRONE

(71) Applicant: Sylvain Roldan De Perera, Larmor Plage (FR)

(72) Inventors: Sylvain Roldan De Perera, Larmor Plage (FR); Dimitry Brega, Kharkov (UA)

(73) Assignee: Sylvain Roldan De Perera, Larmor Plage (FR)

( * ) Notice: Subject to any disclaimer, the term of this patent is extended or adjusted under 35 U.S.C. 154(b) by 274 days.

(21) Appl. No.: 17/778,152

(22) PCT Filed: Nov. 17, 2020

(86) PCT No.: PCT/EP2020/082443
§ 371 (c)(1),
(2) Date: Jun. 17, 2022

(87) PCT Pub. No.: WO2021/099334
PCT Pub. Date: May 27, 2021

(65) Prior Publication Data
US 2023/0002045 A1 Jan. 5, 2023

(30) Foreign Application Priority Data

Nov. 19, 2019 (FR) ...................................... 1912888

(51) Int. Cl.
*B64C 39/02* (2023.01)
*B64C 3/56* (2006.01)
(Continued)

(52) U.S. Cl.
CPC .............. *B64C 39/024* (2013.01); *B64C 3/56* (2013.01); *B64C 27/24* (2013.01); *B64D 35/00* (2013.01);
(Continued)

(58) Field of Classification Search
CPC ....... B64C 27/24; B64C 27/024; B64C 11/28; B64C 29/04; B64U 30/293; B64U 50/18;
(Continued)

(56) References Cited

U.S. PATENT DOCUMENTS 3,116,040 A * 12/1963 Petrides .................. B64C 27/18
244/7 B
6,056,237 A * 5/2000 Woodland ................. B64C 3/56
244/49

(Continued)

FOREIGN PATENT DOCUMENTS

| EP | 3290337 A1 | 3/2018 |
|---|---|---|
| WO | 2018/024567 A1 | 2/2018 |
| WO | 2018/187844 A1 | 10/2018 |

OTHER PUBLICATIONS

International Search Report (ISR) for PCT/EP2020/082443 mailed Feb. 15, 2021 (6 pages).

(Continued)

*Primary Examiner* — Christopher D Hutchens
(74) *Attorney, Agent, or Firm* — Shumaker, Loop & Kendrick, LLP

(57) ABSTRACT

A drone including a front section, a wing structure supported by a rotor located behind the front section, and a propeller at the rear. The wing structure including two wings rotating the rotor, the wing structure being able to move between a flight configuration, in which the rotor is immobile relative to the front section and the propulsion provided by the propeller, and a flight configuration with the wing structure rotating, in which the rotor is rotated relative to the front section, the rotor being connected to the front section with a possibility of orienting its axis of rotation relative thereto in order able to direct the drone in the rotary wing structure configuration by acting on said orientation.

19 Claims, 18 Drawing Sheets

(51) Int. Cl.
*B64C 27/24* (2006.01)
*B64D 35/00* (2006.01)
*B64F 1/04* (2006.01)
*F16C 11/04* (2006.01)
*B64U 50/14* (2023.01)
*B64U 70/00* (2023.01)

(52) U.S. Cl.
CPC ............... *B64F 1/04* (2013.01); *F16C 11/04* (2013.01); *B64U 50/14* (2023.01); *B64U 70/00* (2023.01)

(58) Field of Classification Search
CPC ........... B64U 80/82; B64U 70/20; F02K 9/88; F02K 1/008
USPC ........................................................ 244/7 B See application file for complete search history.

(56) References Cited

U.S. PATENT DOCUMENTS

| | | | | |
|---|---|---|---|---|
| 8,492,692 | B2* | 7/2013 | Fisher | B64C 39/024 244/175 |
| 9,789,950 | B1* | 10/2017 | Most | B64C 3/56 |
| 10,054,939 | B1* | 8/2018 | Applewhite | G08G 5/0008 |
| 11,027,840 | B2* | 6/2021 | Zhang | G05D 1/0094 |
| 11,117,649 | B2* | 9/2021 | Alley | B64C 39/024 |
| 2006/0255205 | A1 | 11/2006 | Gleich et al. | |
| 2011/0006166 | A1 | 1/2011 | Arlton et al. | |
| 2012/0097801 | A1* | 4/2012 | Barrett | B64C 27/24 244/17.11 |
| 2018/0057161 | A1* | 3/2018 | Groninga | B64C 27/50 |
| 2018/0101169 | A1* | 4/2018 | Applewhite | B64C 39/024 |
| 2020/0070969 | A1* | 3/2020 | Campbell | B64C 11/28 |

OTHER PUBLICATIONS

Written Opinion for PCT/EP2020/082443 mailed Feb. 15, 2021 (12 pages).

* cited by examiner

DRONE

TECHNICAL FIELD

The present invention relates to a drone with adaptable wing structure and to a corresponding launcher.

BACKGROUND

Application WO 2018/024567 discloses a drone with adaptable wing structure, comprising two wings connected to a rotor, the wing structure being able to be adapted between a rapid-flight configuration in which the rotor is immobile relative to the fuselage and a rotary-wing flight configuration in which the rotor is rotationally driven relative to the fuselage.

There is a need to improve this type of drone still further, and notably to improve the maneuverability thereof when flying in the rotary-wing flight configuration.

DESCRIPTION OF THE INVENTION

The invention seeks to meet this need, according to a first of its aspects.

SUMMARY OF THE INVENTION

Thus, one subject matter of the invention is a drone comprising a front section, a wing structure borne by a rotor situated behind the front section, and a propeller at the rear, the wing structure comprising two wings rotating with the rotor, the wing structure being able to adapt between a flight configuration in which the rotor is stationary relative to the front section and the propulsion is provided by the propeller, and a rotary-wing flight configuration in which the rotor is rotationally driven relative to the front section, the rotor being connected to the front section with the possibility of orienting its axis of rotation relative to said front section so as to be able to steer the drone in the rotary-wing configuration by altering said orientation.

Thanks to the possibility of orienting the rotor in advancing flight in the rotary-wing configuration, the drone can be steered horizontally without the need to provide a complex cyclic-pitch control at the connection between the wings and the rotor.

With the drone comprising a stator bearing the rotor, the stator may be connected by at least one actuator to the front section, the actuator being designed to modify the orientation of the stator relative to the front section when actuated. As a preference, the drone comprises several actuators connecting the front section to the stator and, when actuated, making it possible to modify the orientation of the stator relative to the front section about at least two axes. As a greater preference, the drone comprises three actuators connecting the front section to the stator, these being positioned 120° apart about the longitudinal axis of the stator. These actuators are preferably linear actuators and are preferably each connected to the stator by a swivel joint.

Like a helicopter, the drone according to the invention may have a collective pitch control and a cyclic pitch control. The collective pitch control can be provided by actuators situated in the wings. The cyclic pitch control is achieved by inclining the stator. Thus, as a preference, the wings can pivot relative to the rotor in order to change incidence, thereby making it possible to change the collective pitch in the rotary-wing configuration.

As a preference, the drone comprises a swivel-joint connection between the front section and the stator. Such a connection advantageously is able to react some of the mechanical load between the front section and the stator. A deflector advantageously covers this joint, so as to maintain continuity of the fuselage at the transition between the front section and the stator, in spite of the changes in orientation of the latter.

The drone comprises a motor for driving the rotation of the propeller. This motor is preferably housed in the front section, a drivetrain connecting the motor to the propeller, this drivetrain comprising a universal joint allowing drive to be transmitted from the motor to the propeller despite the changes in orientation of the axis of rotation of the rotor relative to the front section. As a preference, the drone is arranged in such a way that the movements orienting the axis of rotation of the rotor are effected about a center of rotation on which the universal joint is centered.

As a preference, the propeller and the rotor are moved by one and the same motor. The rotor may be driven via an epicyclic reduction gearbox.

The drone may comprise a rear section bearing the propeller, the rotor rotating between the front and rear sections.

As a preference, each wing is connected to the rotor by a mast comprising a joint allowing the wing to be folded against the fuselage during a phase of launch of the drone, when the latter is contained inside a launcher.

As a further preference, the drone comprises a mechanism allowing the hinge to be immobilized once the wing has deployed. This blocking mechanism may comprise a locking ring which in the locked position covers the hinge and thus immobilizes the mast in a configuration in which it is coaxial with the ring. An actuator housed in the wing may generate a relative movement between the mast and the locking ring to bring the latter into its blocking configuration.

The variation in incidence of the wing relative to the rotor can be obtained by a mechanism which converts a rotational movement of an actuator into an axial movement of the mast. The latter may comprise a first stud near to the actuator and a second stud near to the rotor. The two studs move together under the action of the actuator. The latter drives the rotation of a drive ring that has an axial slot in which the first stud is engaged. The first stud is also engaged in a helical slot of a tubular part fixed with the wing, secured to the locking ring. Thus, a rotation of the drive ring is accompanied by an axial movement of the mast relative to the locking ring and to the fixed tubular part. The second stud is engaged in a slot formed on a tubular part which is fixed on the rotor and which rotates therewith. This slot comprises a first portion which is linear and extends radially, and a second portion which is helical. When the mast moves axially, under the effect of the rotation of the actuator, the second stud moves along the linear first portion and then along the second portion. The first portion serves to lock the wing in the fixed-wing forward-flight configuration. The second portion allows modification of the incidence of the wing in the rotary-wing configuration, so as to vary the collective pitch.

Another aspect of the invention, independently of or in combination with the foregoing, has as its subject matter a launcher that can be used to launch a drone as defined above, comprising a cap able to house the drone, and four vectored-thrust boosters for orienting the launcher.

As a preference, the drone has folding wings that can be folded against the fuselage when the drone is contained inside the launcher.

As a preference, the cap comprises two articulated sections which are kept closed by the aerodynamic thrust when the launcher is moving at high speed.

As a preference, the drone comprises folding wings which can be folded against the fuselage when the drone is contained inside the cap.

As a preference, each booster comprises a deflector comprising a body able to pivot about a first axis of rotation, this body enclosing an element that is able to pivot about a second axis perpendicular to the first. The body may notably be formed of two units which are assembled around a toric section constituting said element.

As a preference, a system of redundant actuators provides control of the pivoting of the deflector about these two axes of rotation.

BRIEF DESCRIPTION OF THE DRAWINGS

The invention may be better understood from reading the detailed description which follows of one non-limiting exemplary embodiment thereof, and from studying the attached drawing, in which.

DETAILED DESCRIPTION

Figure 1:
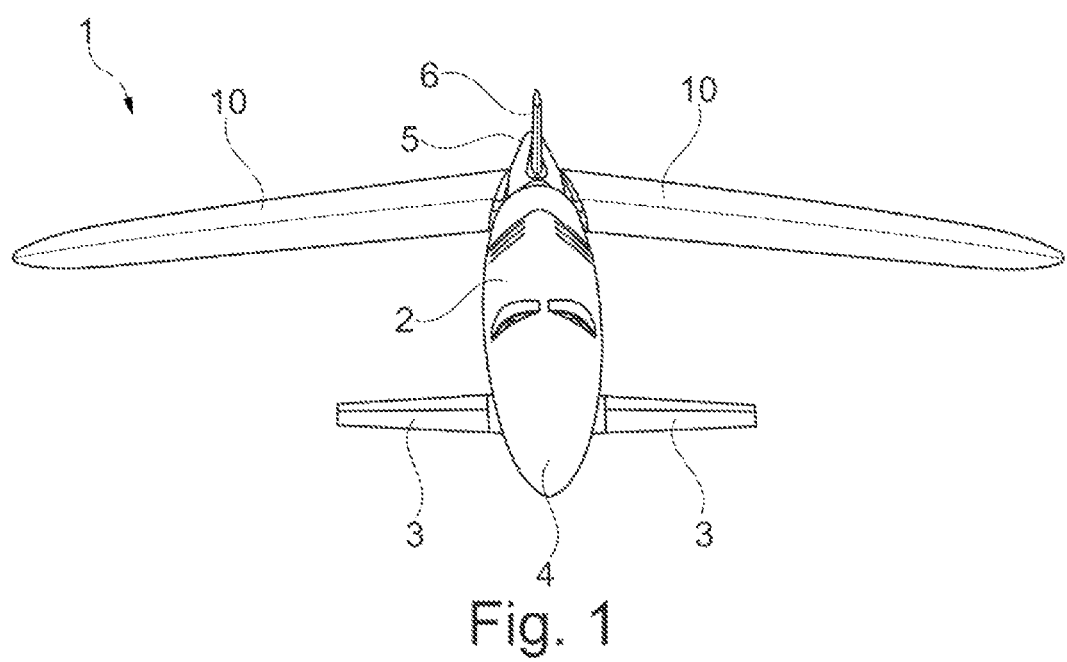
FIG. 1 depicts one example of a drone in a fixed-wing rapid-flight configuration.
Figure 2:
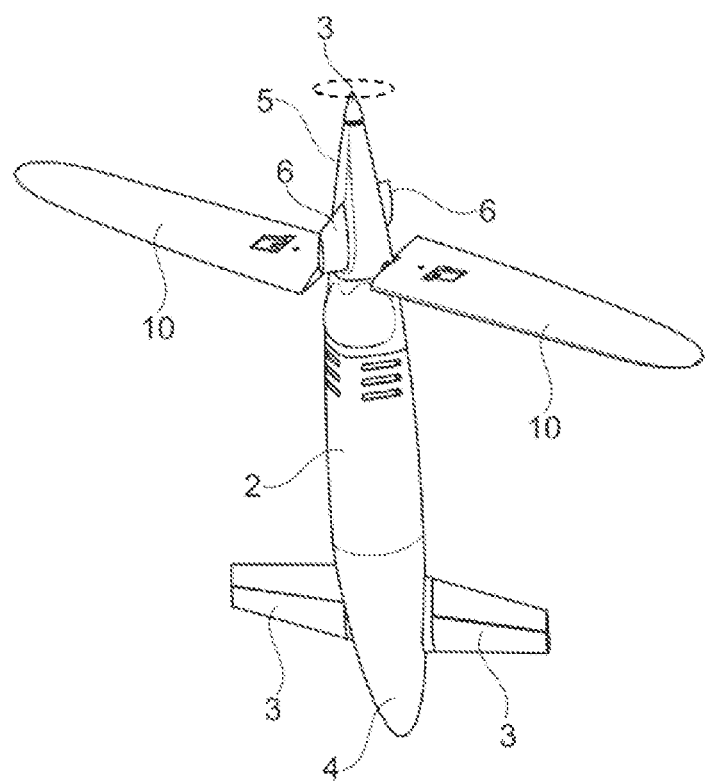
FIG. 2 depicts the drone of FIG. 1 in a rotary-wing configuration.
Figure 3:
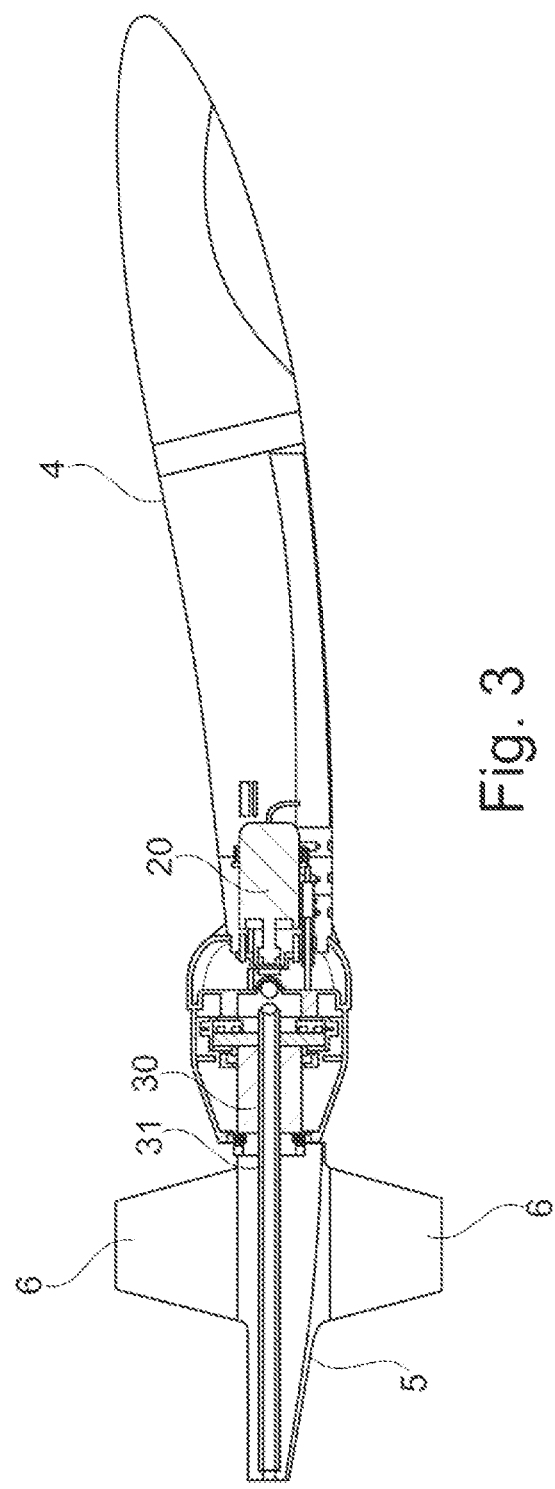
FIG. 3 is a partial and schematic longitudinal section through the drone of FIGS. 1 and 2.
Figure 4:
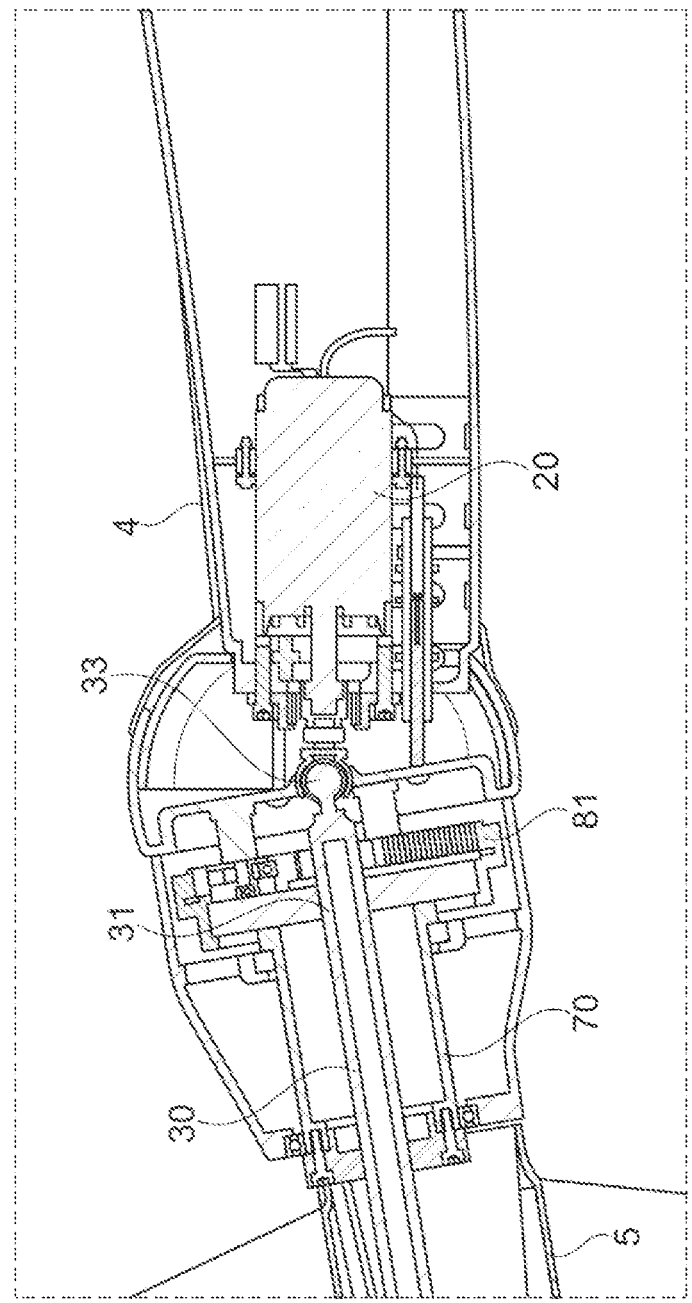
FIG. 4 depicts a detail of the connection between the stator and the front section of the drone, for a given orientation of the axis of rotation of the rotor.
Figure 5:
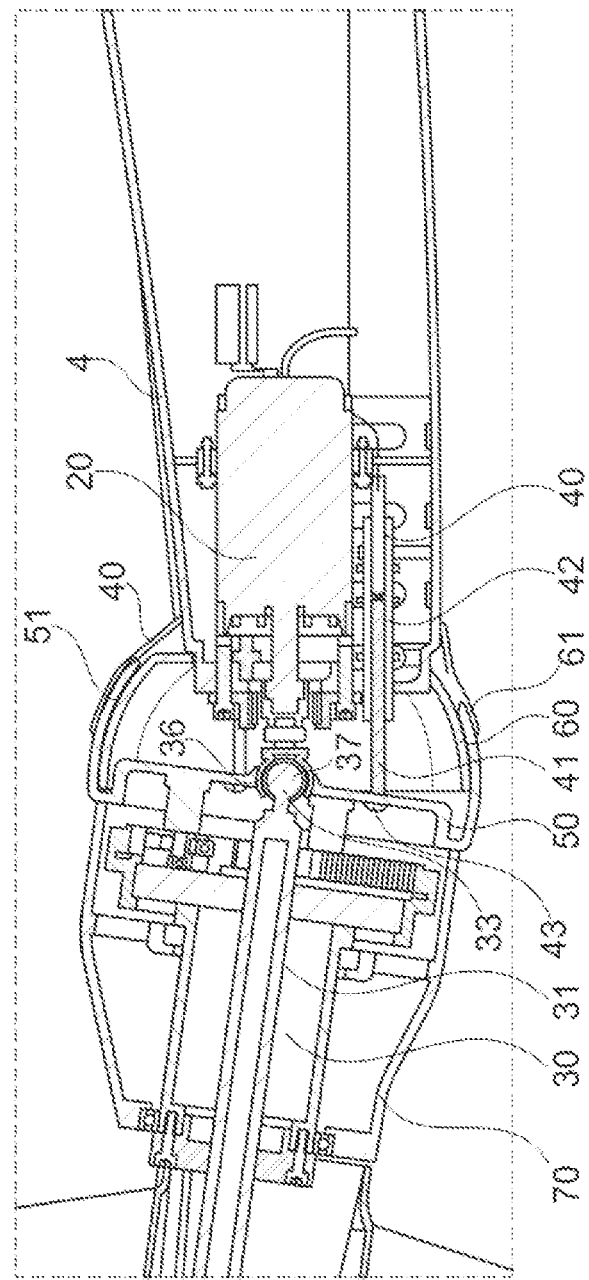
FIG. 5 is a view similar to FIG. 4 for a different orientation of the axis of rotation of the rotor.

The drone 1 according to the invention and depicted in FIGS. 1 and 2 comprises two wings 10 which are able to move relative to the fuselage 2 between a fixed-wing configuration corresponding to FIG. 1, and a rotary-wing configuration illustrated in FIG. 2.

The drone 1 comprises, at the rear, a propeller 3 depicted schematically in FIG. 2 and, at the front, canard foreplanes 3. The rear section 5 of the drone 1 may bear ailerons and/or rudders 6.

In the fixed-wing configuration, the wings 10 are fixed relative to the fuselage, with a forward-swept configuration, allowing the drone to move like an airplane, in rapid flight. The forward-swept configuration offers a combination of advantages including energy efficiency associated with its low drag, optimized lift and payload, better maneuverability and greater tolerance to stalling at very low speed.

In the example illustrated, the fuselage of the drone has a central bay, of prismatic cross section, which contributes to its lift.

In the rotary-wing configuration, the wings 10 rotate with a rotor relative to the front section 4 of the drone, with opposite incidences. In this configuration, the wings 10 act like helicopter blades. The propeller 3 can then rotate in the opposite direction from the wings 10, in order to provide counter torque.

When the drone is moving in advancing flight in the rotary-wing configuration, the dorsal ridge of the prismatic cross section of the central bay is preferably positioned to face into the relative airflow.

According to a first aspect of the invention, the axis of rotation of the rotor can be oriented relative to the front section 4 making it possible to control the advance of the drone in the rotary-wing configuration.

If reference is now made more particularly to FIGS. 3 to 8, it may be seen that the drone 1 comprises a main electric motor 20, preferably of the brushless type, housed in the front section 4 and connected to the propeller 3 by a drivetrain 30 comprising a shaft 31.

The front section 4 houses three actuators 40 arranged 120° apart about the axis of rotation of the motor 20. These actuators 40 are linear actuators in the example considered and each comprise a rod 41 able to move axially relative to the body 42 of the actuator. The rods 41 are connected at their end by a swivel joint 43 to a stator 50 and are able to control the orientation of the latter relative to the front section 4.

The stator 50 comprises a peripheral skirt 51 in the form of a portion of a sphere, which forms a swivel joint with an internal skirt 60 of corresponding shape belonging to the front section 4.

A deflector 61 mounted on the fuselage of the front section 4 partially covers the peripheral skirt 51 and provides a certain continuity of the exterior surface of the drone 1, for better aerodynamic performance.

The wings 10 are borne by a rotor 70 which can rotate relative to the stator 50.

The motor 20 preferably incorporates an eddy current electromagnetic brake and a rotor positioning sensor such as an optical encoder.

The electromagnetic brake allows the rotor 70 running at full power to be immobilized quickly. Its position is continually determined by the optical encoder allowing the motor controller to reposition the rotor if necessary.

A transmission mechanism 80 allows the rotor 70 to be driven by the motor 20.

Figure 7:
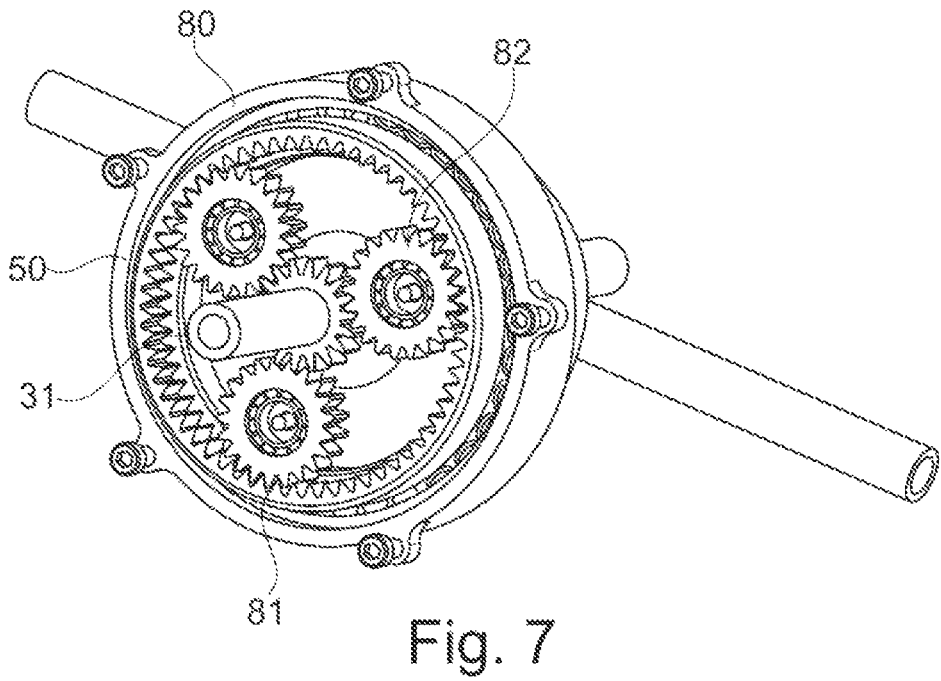
FIG. 7 is a schematic partial view of the rotor drive mechanism.
Figure 8:
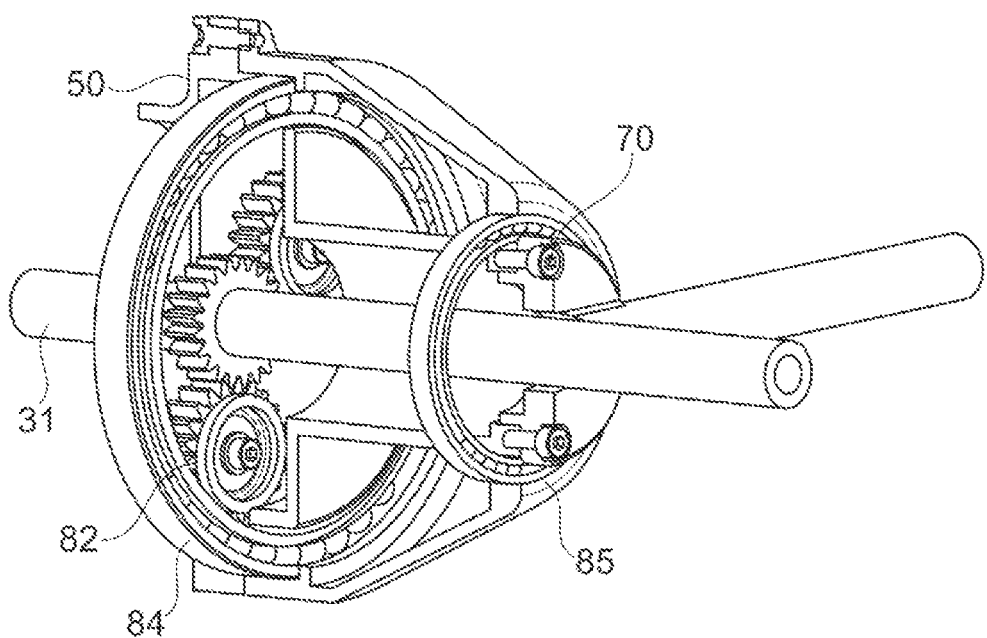
FIG. 8 is a partial and schematic view in longitudinal section of the mechanism of FIG. 7, FIG. 9 partially and schematically depicts the connection between the wings and the rotor.

In the example illustrated, this mechanism 80 is of the epicyclic reduction gearbox type and comprises, as is more particularly visible in FIG. 7, an inner sungear 32 consisting of a gearwheel mounted on the shall 31, a large ring gear 81 that forms an integral part of the rotor 70, and a planet carrier 82.

The rotor 70 is guided by rolling bearings 84 and 85 borne by the stator 50.

When this is blocked, rotation of the shaft 31 drives that of the rotor 70, with a reduction ratio. In that case, the propeller 3 rotates in the opposite direction to the rotor 70.

When the planet carrier 82 is free to rotate, the rotor 70 can have its rotation blocked.

When the large ring gear 81 is blocked, only the propeller 3 is driven in rotation. When the large ring gear 81 is unblocked, the epicyclic gearbox acts like a reduction gearbox and drives the wings 10. This sequence is reversible.

Actuators which have not been shown allow the selective blocking of the rotation of the planet carrier 82 or of the rotor 70.

The drivetrain 30 comprises a universal joint 33 between the shaft 31 and the motor 20 to allow the rotational torque of the motor 20 to be transmitted to the shaft 31 while at the same time allowing freedom in the orientation of the shaft 31 relative to the motor 20.

Figure 6:
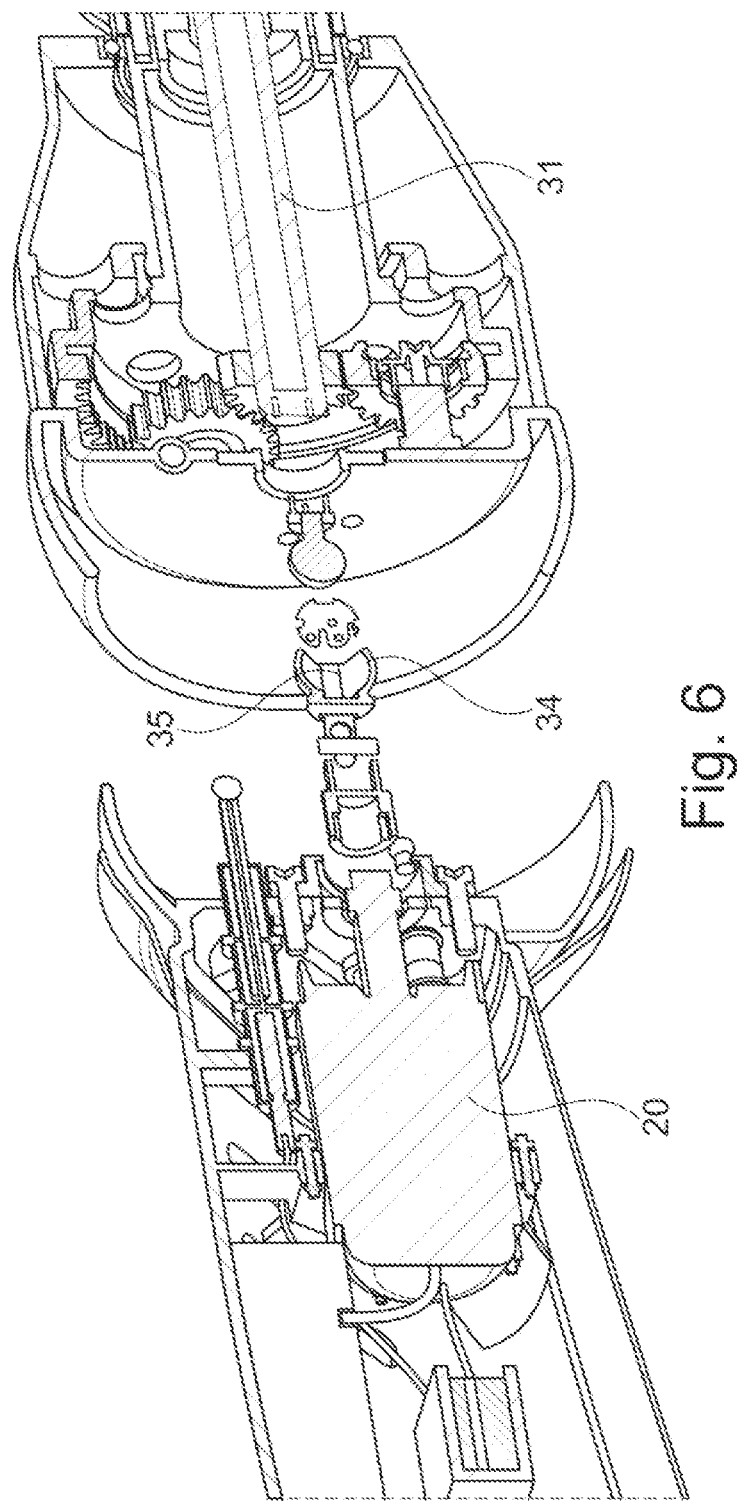
FIG. 6 is an exploded schematic perspective view of the connection between the stator and the front section.

This universal joint 33 may be of the constant-velocity joint type and comprise, as illustrated in FIG. 6, a cage 34 provided on its interior surface with grooves 35 which house balls 36 transmitting torque with an internal ball 37. The cage 34 of the constant-velocity joint 33 and the swivel joint formed between the skirts 51 and 60 are substantially concentric.

Figure 9:
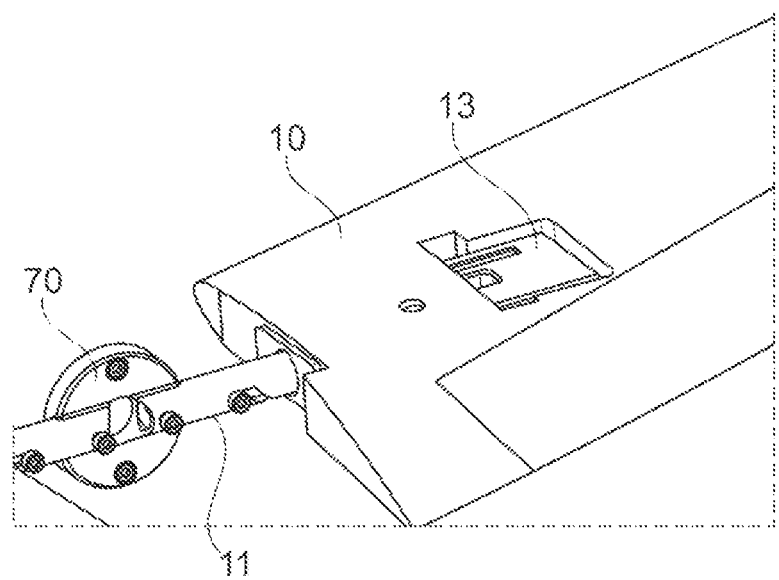
Figure 10:
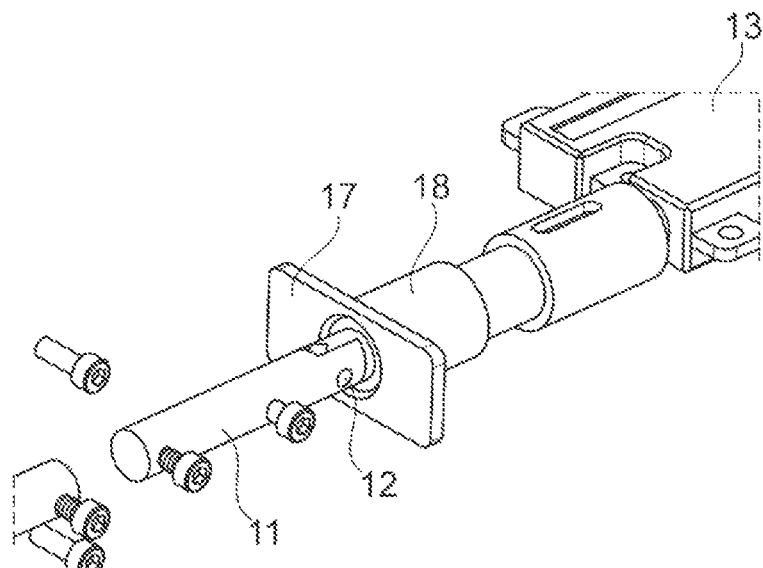
FIG. 10 depicts an embodiment detail of the connection between a wing and the rotor.
Figure 11:
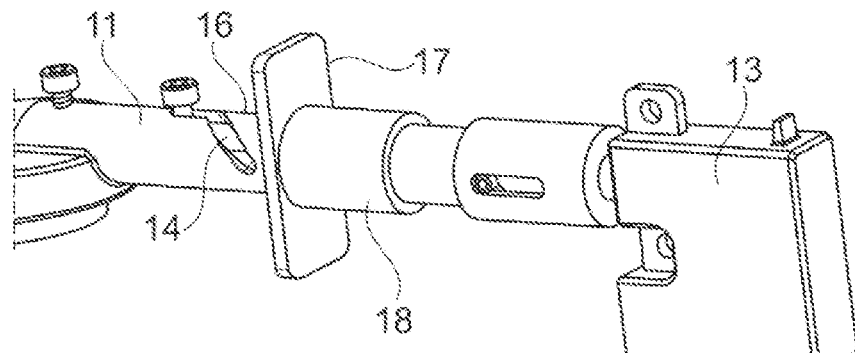
FIG. 11 is a view similar to FIG. 10 of another embodiment detail.
Figure 12:
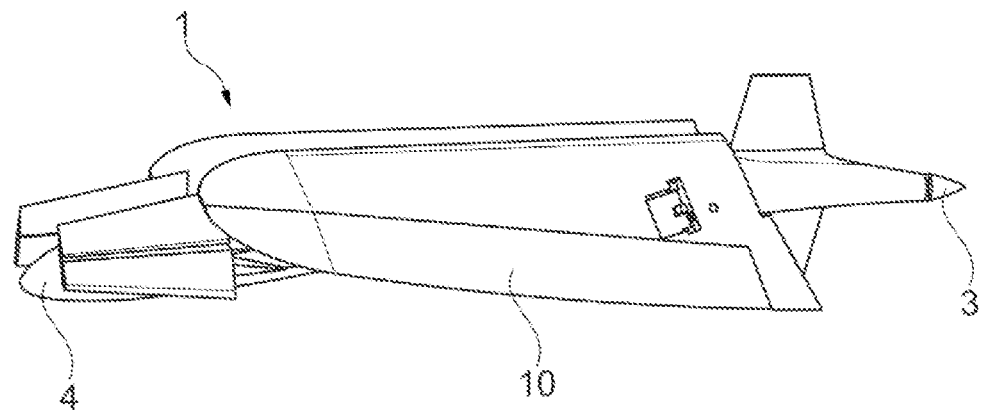
FIG. 12 illustrates the folding of the wings along the fuselage for launch.
Figure 13:
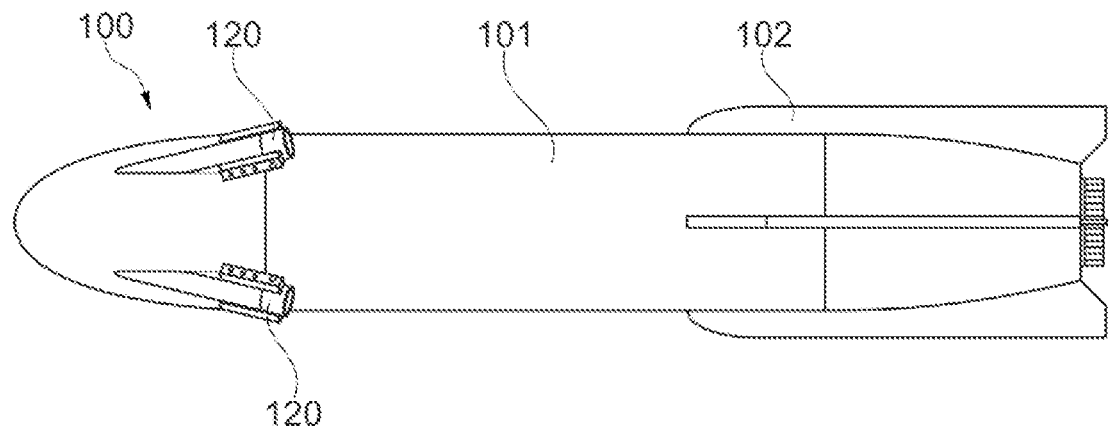
FIG. 13 depicts an example of a launcher viewed face-on, FIG. 14 depicts the launcher of FIG. 13, viewed from the side.
Figure 14:
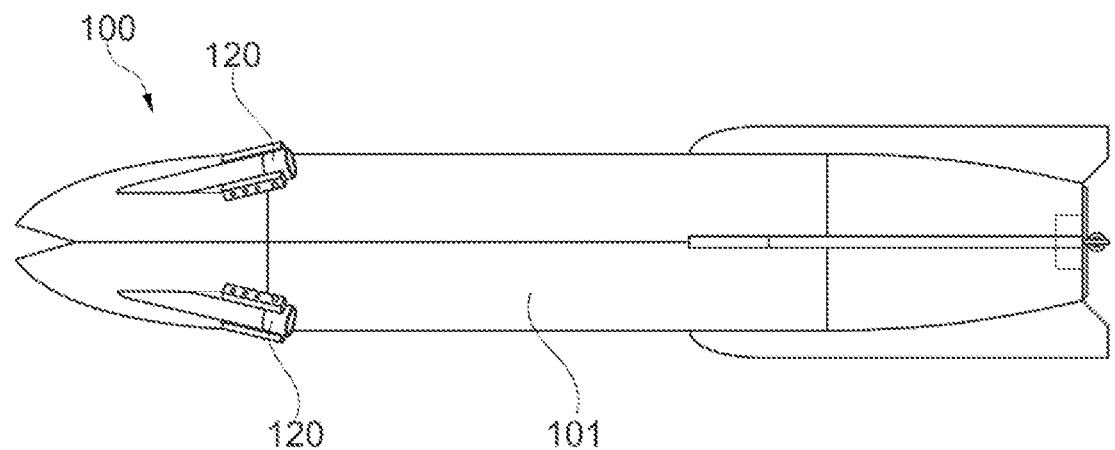

If reference is made to FIGS. 9 to 11 it may be seen that the roots of the wings 10 comprise masts 11 connected to the rotor 70 and each comprising a joint 12, visible in FIG. 10, that allow the wings to be folded against the fuselage as illustrated in FIG. 12.

A rotary actuator 13 is housed in each wing to modify their incidence in the rotary-wing configuration or to block their incidence in the fixed-wing configuration.

The two working axes of the roots allow the wings 10 to be folded along the fuselage and their angle of attack to be adjusted. The wings 10 are automatically deployed by the relative airflow and locked by a locking ring 18 which fits over the articulation 12 when the mast 11 is moved axially relative to this ring 18 by the actuator 13. As can be seen in FIGS. 21 to 25 in particular, each ring 18 takes the form of a cylindrical segment secured to its respective wing and provided with a pull reinforcement 17 perpendicular to its end. The reinforcement 17 hugs the chord of the roots and is embedded in the profile of the wing, behind the leading edge. A mechanism converts a rotational movement of the actuator 13 into an axial movement of the mast 11. The latter may have a first stud 311 near to the actuator and a second stud 312 near to the rotor. The two studs 311 and 312 move together under the action of the actuator 13. The latter drives the rotation of a drive ring 320 which has an axial slot 321 in which the first stud 311 is engaged. The first stud 311 is also engaged in a helical slot 325 of a tubular part 330 fixed with the wing, secured to the locking ring 18. Thus, a rotation of the drive ring 320 is accompanied by an axial movement of the mast 11 relative to the locking ring 18 and to the fixed tubular part 330. The second stud 312 is engaged in a slot 340 formed on the tubular part 341 which is fixed to the rotor 70 and which rotates therewith. This slot 340 has a first portion 343, which is linear and extends radially, and a second portion 344 which is helical. When the mast 11 moves axially under the effect of the rotation of the actuator 13, the second stud 312 moves along the linear first portion 343 and then into the helical second portion 344. The first portion 343 serves to lock the wing 10 when advancing in fixed-wing configuration. The second portion 344 allows the modification of the incidence of the wing 10 in the rotary-wing configuration, in order to vary the collective pitch.

The actuators 13 may be powered from the rotor via rotary slip rings. The actuators may be controlled using carrier currents for example.

In the rotary-wing configuration, the asymmetry between the propeller 3 and the rotor 70 is compensated for mechanically by the epicyclic gearbox which adjusts the number of revolutions per minute between the two. Thus, the volume of air swept by the propeller 30 is preferably substantially equal to the volume of air swept by the wings 10 rotating with the rotor.

The drone 1 can be launched by being contained, with all the wings folded, as illustrated in FIG. 12, in a launcher 100 like the one depicted in FIGS. 13 to 19.

As a preference, this launcher is capable of maneuvering at high speed and, during the launch phase, adopts the flight characteristics of a surface-to-air missile.

The launcher comprises a cap 101 of circular cross section and a cruciform empennage 102. The maneuverability and controllability of the launcher are provided by four boosters 120 arranged symmetrically around the cap.

Figure 15:
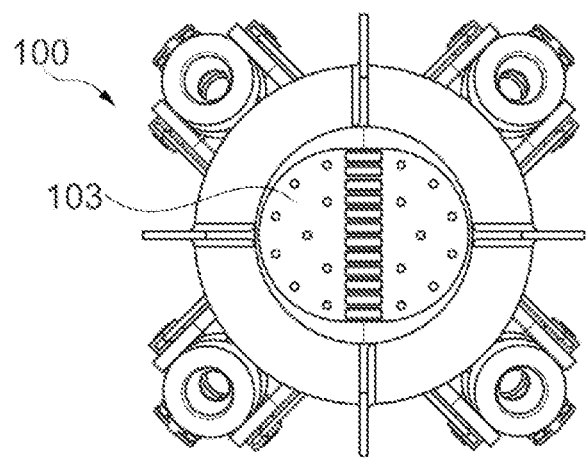
FIG. 15 depicts the launcher of FIG. 13, viewed from beneath.
Figure 16:
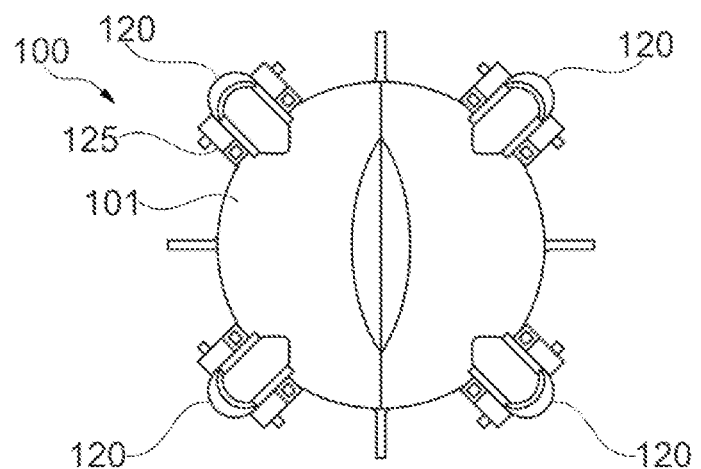
FIG. 16 depicts the launcher of FIG. 13 viewed from above.
Figure 17:
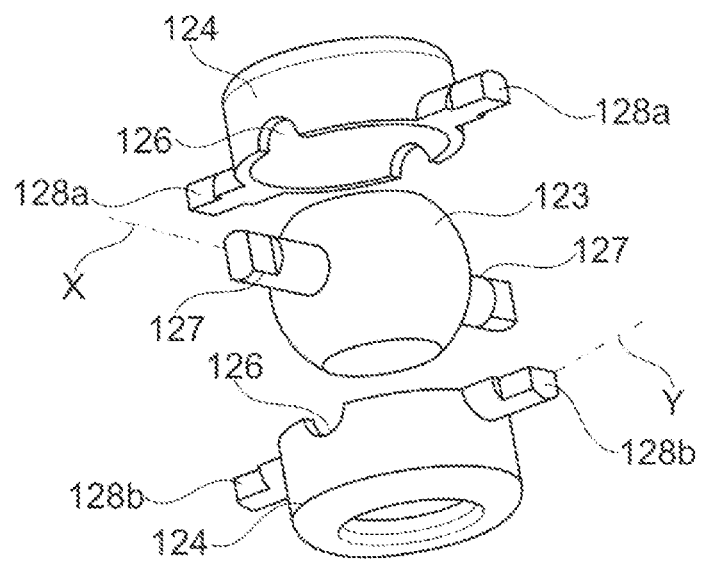
FIG. 17 depicts a detail of the fitting of a deflector, FIG. 18 partially and schematically illustrates the deflector orientation mechanism.

The cap 101 comprises two shells connected at the bottom by an articulation 103 visible in FIG. 15.

The symmetrical thrust from the four boosters 120 acts together to keep the cap 101 closed until they enter their deceleration phase.

Vectored thrust optimizes the positioning times with a very tight turn between vertical launch and horizontal flight. Independent of its maneuverability, the use of vectored thrust means that control of the launcher can be maintained with just three boosters should one of the boosters fail.

The four boosters 120, mounted symmetrically on each side of the cap, each have two degrees of freedom (vertical and horizontal) the resultant being vectored thrust. Each booster is directly connected to a deflector 122 which forces the gases to follow a toric section 123 with inbuilt nozzle, visible in FIG. 17, providing horizontal corrections. Vertical corrections are achieved by the body of the deflector, which is made up of two units 124 encapsulating the toric section 123. The latter is able to pivot about an axis of rotation X relative to the body of the deflector formed by the units 124. The section 123 is produced with diametrically opposed stub axles 127 which are housed in corresponding openings in the body of the deflector, these openings being formed by the mating of cutouts 126 present on each of the units 124.

Figure 18:
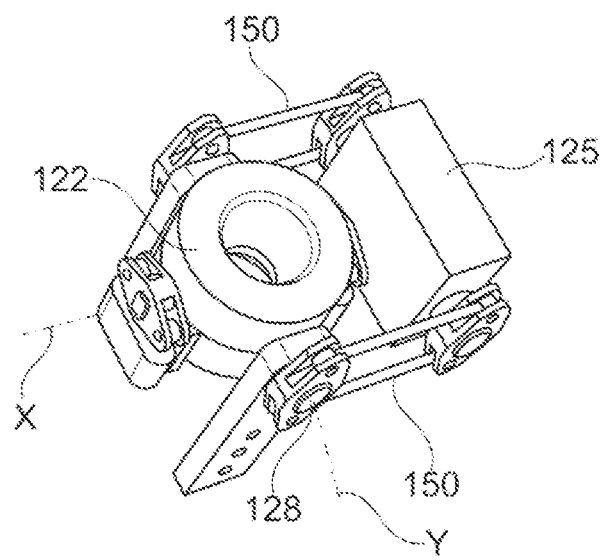

Each unit 124 comprises diametrically opposed half stub axles which when the units 124 are brought together form the stub axles 128 as illustrated in FIG. 18, allowing the deflector to be oriented about an axis of rotation X perpendicular to the axis Y.

Each system of actuators 125 of a booster deflector 120 is preferably provided with symmetrical redundancy regarding commands for rotation both about the axis X and about the axis Y, giving the system reliability.

In particular, as illustrated, the body of the deflector may bear two actuators each one connected to a respective stub axle 127, to control the tilting of the toric section 123 relative to the body of the deflector, and this can pivot about the axis Y under the action of two actuators each connected to a stub axle 128 by a respective linkage mechanism 150.

The reliability of release is critical to mission success and the load factors exerted on the cap 101 may compromise opening. In order to remove this risk, the cap is kept closed at high speed during the tight turns that the launcher is liable to make and during the deceleration phase thereof.

Throughout the duration of the flight, the airflow applies pressure to the convex deflection surface of the cap and separation occurs at a controlled velocity during deceleration. The launcher opening velocity is controlled by the joint effects of the air pressure, for example by way of a Pitot tube, and the mechanical pressure applied to the fuselage, for example by means of a piezoelectric pressure sensor.

Figure 19:
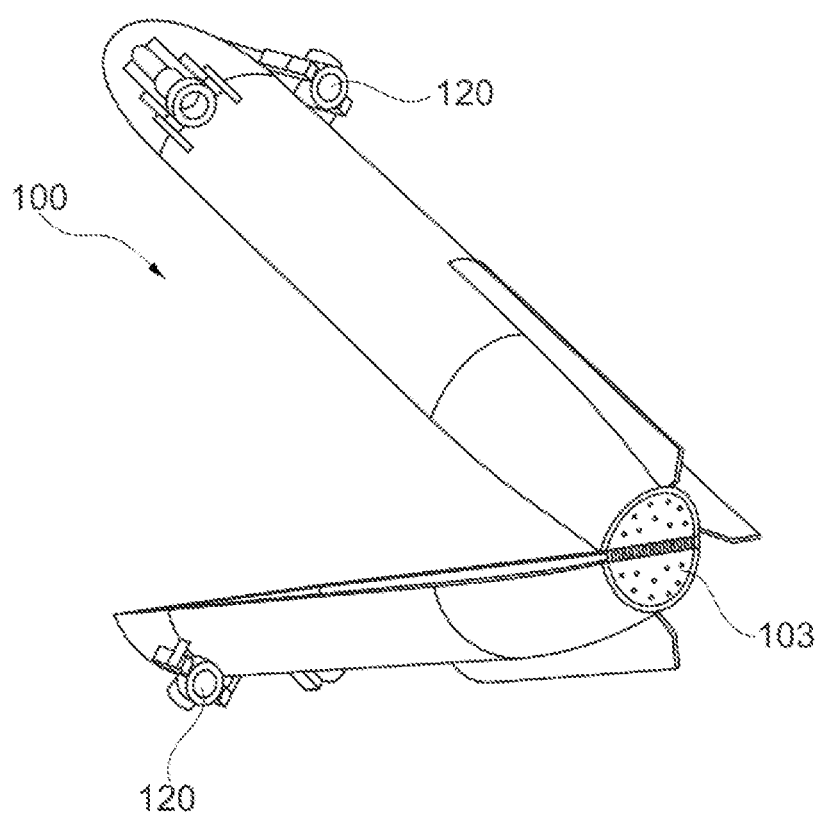
FIG. 19 illustrates the opening of the launcher.

Once it reaches the programmed position, the cap 101 opens, as illustrated in FIG. 19, and ejects the drone 1 which can then continue its flight in fixed-wing or rotary-wing configuration. Once the mission is over, the drone 1 can be recovered by an autonomous land system with which it communicates.

Figure 20:
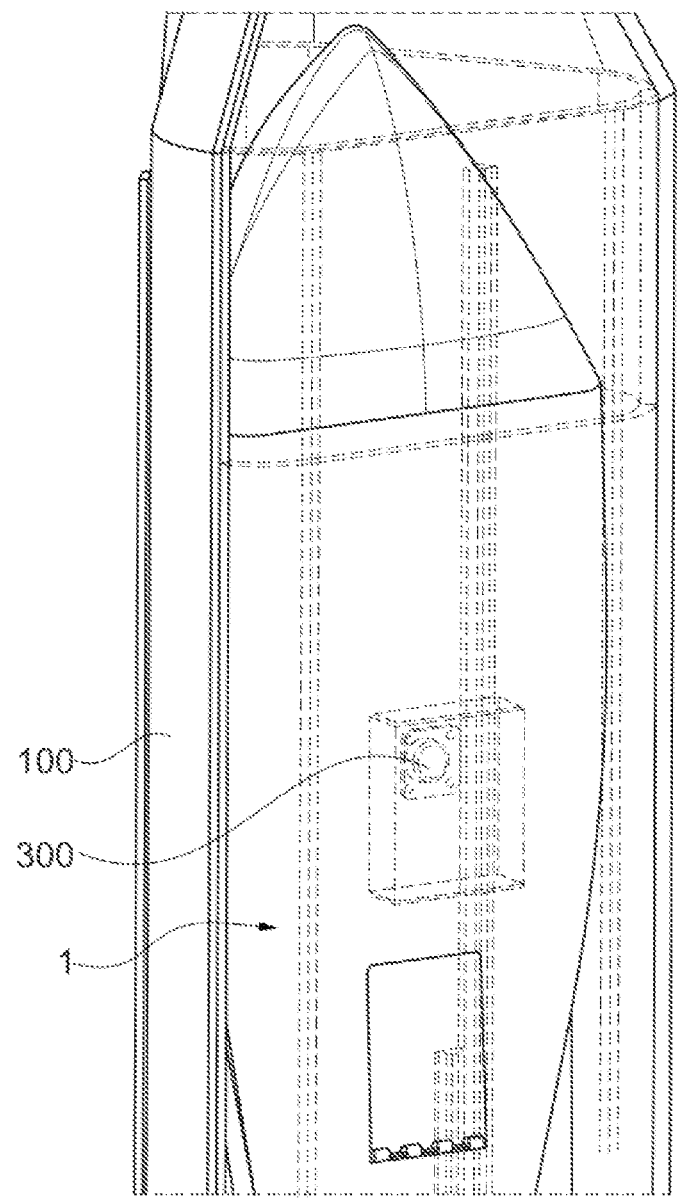
FIG. 20 depicts a connector that allows the drone to exchange data with the launcher, when present within same.
Figure 21:
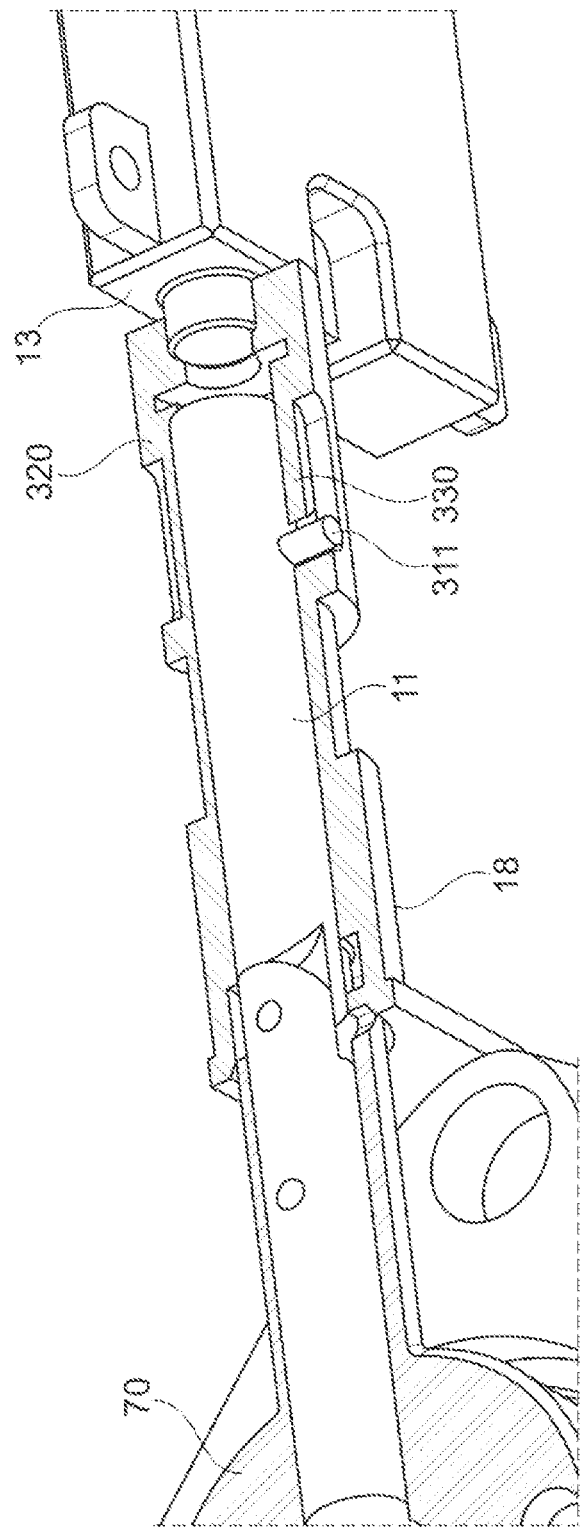
FIG. 21 is a schematic and partial longitudinal section of the mechanism integrated into the root of a blade.
Figure 22:
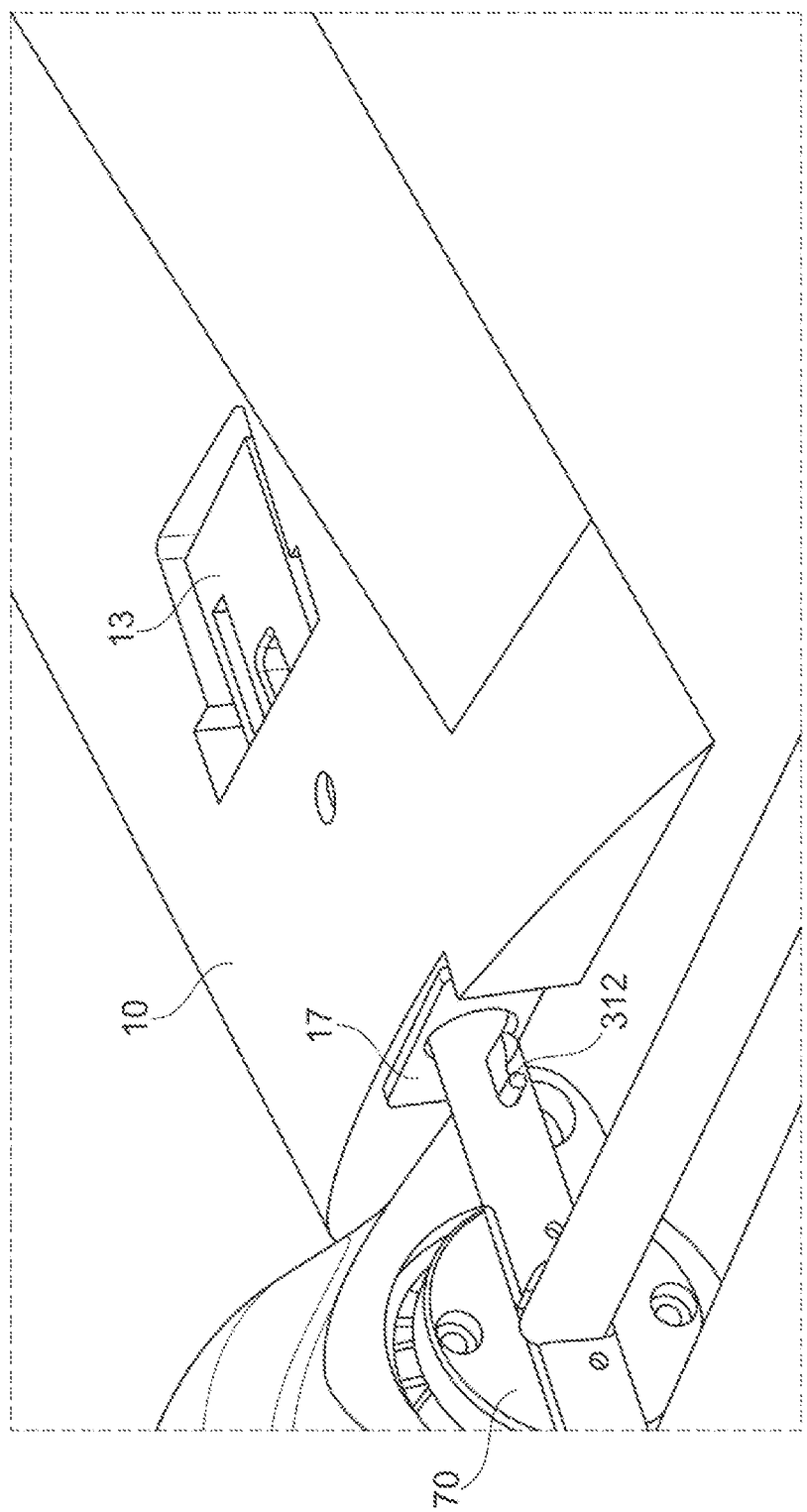
FIG. 22 depicts the blade at its root.
Figure 23:
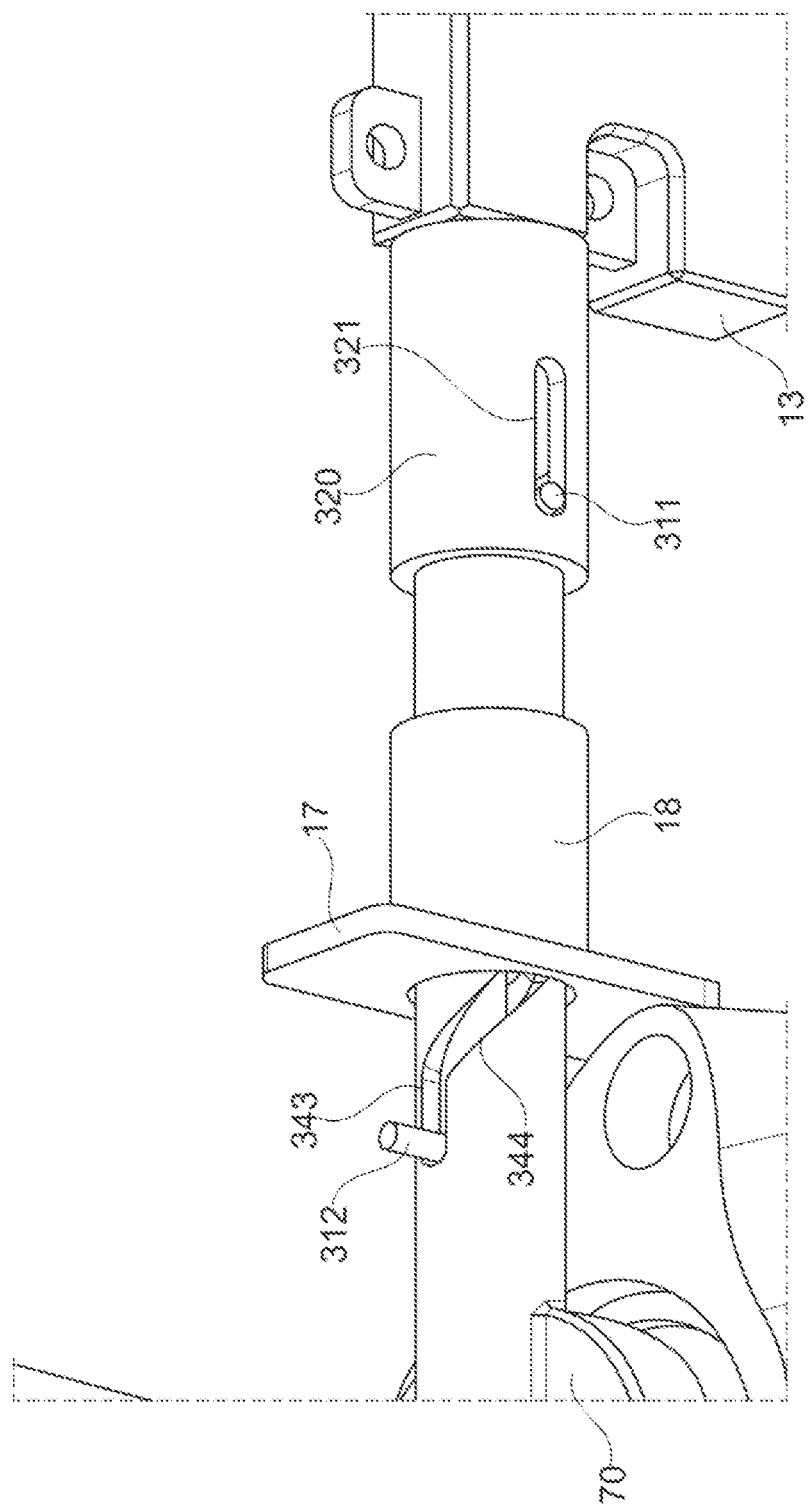
FIG. 23 depicts the mechanism of FIG. 21, from a different angle.
Figure 24:
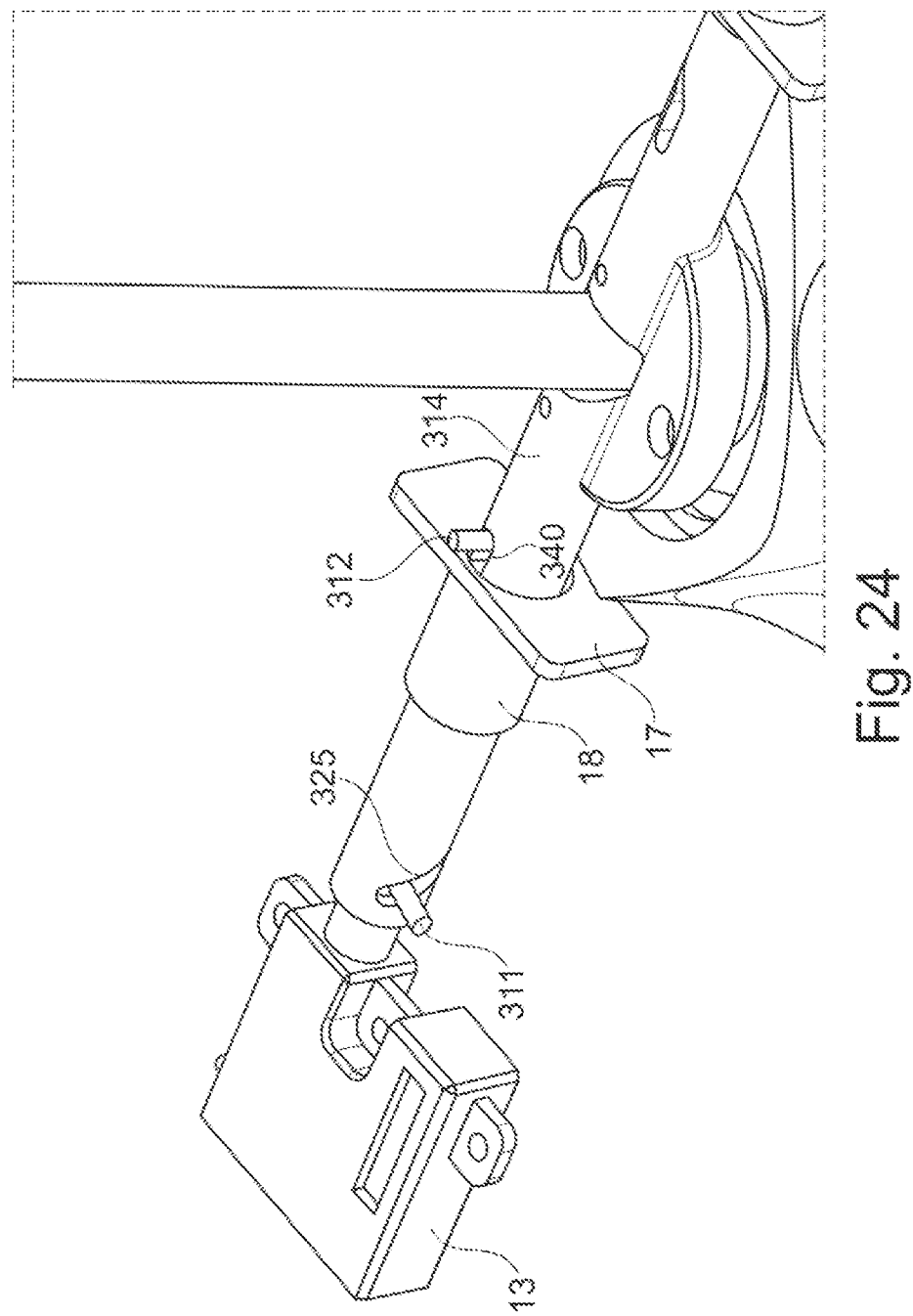
FIG. 24 is a view analogous to FIG. 23, from a different angle
Figure 25:
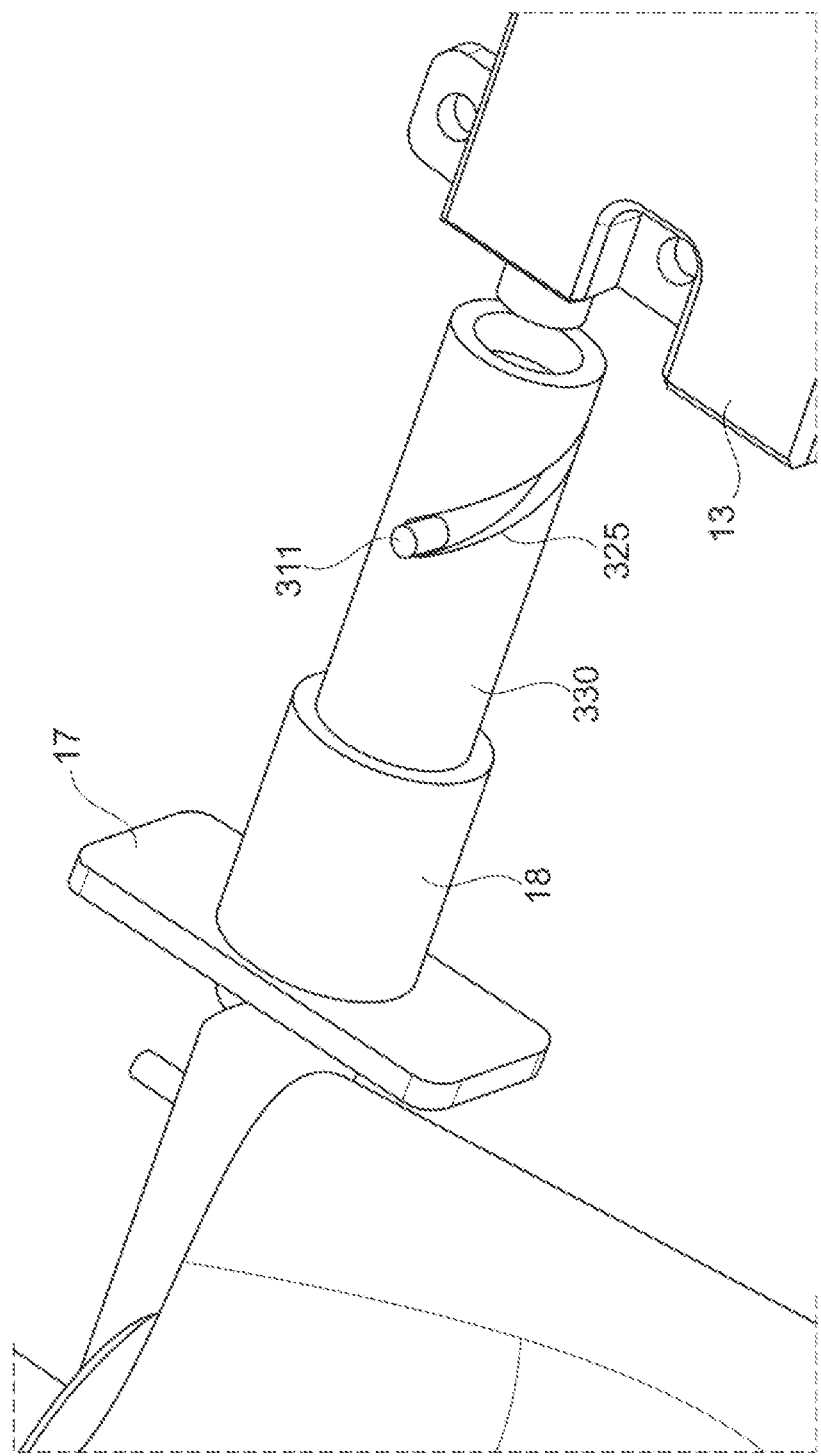
FIG. 25 depicts the mechanism of FIGS. 23 and 24, with the drive ring removed.

The drone may, as illustrated in FIG. 20, comprise a connector 300 connected to a corresponding connector present on the launcher (not visible) for the exchange of data between the two, and notably allowing control of the boosters and deflectors by the electronics of the drone during the launch phase. During the release of the drone, the connectors separate. The connector 300 may be present on the ventral face of the fuselage.

In an alternative, the drone is gyrostabilized by motors equipped with small bladed rotors housed in the fuselage. These motors play no part in the lift of the drone, and their capability is strictly limited to producing counter torque thrust and creating a moment that allows an approach path to be maintained with a given angle during landing. In order to avoid stability problems associated with the differences in pressure between the exterior surface of the cell and the inside, the openers may be closed off by a circular slide mechanism incorporated into the nose of the cell. The mechanism may be passive and the slide may reach its position under the effect of gravity. In the event of reversal of the configuration of the wing structures (rotary-wing/fixed wing) the extension generated by the slide shifts the center of gravity towards the rear of the platform, thus contributing to increasing its stability at low speed. At high speed, the slide retracts under the pressure of the relative airflow.

The invention claimed is:

1. A drone comprising
a front section,
a wing structure borne by a rotor situated behind the front section,
and a propeller at the rear of the drone, the wing structure comprising two wings rotating with the rotor,
the wing structure configured to adapt between a flight configuration in which the rotor is stationary relative to the front section and the propulsion is provided by the propeller, and a rotary-wing flight configuration in which the rotor is rotationally driven relative to the front section,
the rotor being connected to the front section and configured to orient its axis of rotation relative to said front section so as to be able to steer the drone in the rotary-wing configuration by altering said orientation.

2. The drone as claimed in claim 1, further comprising a stator bearing the rotor, the stator being connected by at least one actuator to the front section, the actuator being designed to modify the orientation of the stator relative to the front section when actuated.

3. The drone as claimed in claim 2, further comprising several of the at least one actuators connecting the front section to the stator and, when actuated, configured to modify the orientation of the stator relative to the front section about at least two axes.

4. The drone as claimed in claim 3, further comprising three of the at least one actuators connecting the front section to the stator, the actuators being positioned 120° apart about the longitudinal axis of the stator.

5. The drone as claimed in claim 2, further comprising a swivel-joint connection between the front section and the stator.

6. The drone as claimed in claim 1, further comprising a motor for driving the rotation of the propeller, the motor being housed in the front section,
a drivetrain connecting the motor to the propeller, the drivetrain comprising a universal joint allowing drive to be transmitted from the motor to the propeller despite the changes in orientation of the axis of rotation of the rotor relative to the front section.

7. The drone as claimed in claim 6, wherein the movements orienting the axis of rotation of the rotor are effected about a center of rotation on which the universal joint is centered.

8. The drone as claimed in claim 1, wherein the wings are configured to pivot relative to the rotor in order to change the incidence of the wings.

9. The drone as claimed in claim 8, wherein the variation in incidence of the wing relative to the rotor being obtained by a mechanism which converts a rotational movement of an actuator into an axial movement of a mast.

10. The drone as claimed in claim 9, wherein the mast comprises a first stud near to the actuator and a second stud near to the rotor, the two studs moving together under the action of the actuator, the actuator driving the rotation of a drive ring that has an axial slot in which the first stud is engaged, the first stud also being engaged in a helical slot of a tubular part fixed with the wing, secured to a locking ring, a rotation of the drive ring being accompanied by an axial movement of the mast relative to the locking ring and to the fixed tubular part, the second stud being engaged in a slot formed on a tubular part which is fixed on the rotor and which rotates therewith, the slot comprising a first portion which is linear and extends radially, and a second portion which is helical.

11. The drone as claimed in claim 1, wherein the propeller and the rotor are moved by a single motor.

12. The drone as claimed in claim 1, further comprising a rear section bearing the propeller, the rotor rotating between the front and rear sections.

13. The drone as claimed in claim 1, wherein each wing is connected to the rotor by a mast comprising a joint allowing the wing to be folded against the fuselage during a phase of launch of the drone, when the drone is contained inside a launcher, the drone comprising a mechanism allowing the hinge to be immobilized once the wing has deployed.

14. The drone as claimed in claim 13, wherein the blocking mechanism comprises a locking ring which in the locked position covers a hinge and thus immobilizes the mast in a configuration in which the mast is coaxial with the ring and/or an actuator housed in the wing configured to generate a relative movement between the mast and the locking ring to bring the locking ring into a blocking configuration.

15. A launcher in which there is placed a drone as claimed in claim 1, the drone comprising folding wings which can be folded against the fuselage when the drone is contained inside the launcher.

16. The launcher as claimed in claim 15, wherein the launcher comprising a cap housing the drone, and four vectored-thrust boosters for orienting the launcher.

17. The launcher as claimed in claim 16, the cap comprising two articulated sections which are kept closed by the aerodynamic thrust when the launcher is moving at high speed.

18. The launcher as claimed in claim 16, wherein each booster comprising a deflector comprising a body able to pivot about a first axis of rotation.

19. The launcher as claimed in claim 18, the body being made up of two units which are assembled around a toric section constituting said element and/or a system of redundant actuators providing control of the pivoting of the deflector about two axes of rotation.

* * * * *